United States Patent [19]

Sugita et al.

[11] Patent Number: 4,820,594

[45] Date of Patent: Apr. 11, 1989

[54] METHOD OF STARTING FUEL CELL POWER GENERATION SYSTEM

[75] Inventors: Shigehisa Sugita; Kazuhito Koyama, both of Hitachi; Koji Shiina, Mito; Seiichiro Sakaguchi, Hitachi; Michio Kuroda, Hitachi; Yoshiki Noguchi, Hitachi, all of Japan

[73] Assignee: Hitachi, Ltd., Tokyo, Japan

[21] Appl. No.: 12,170

[22] Filed: Feb. 9, 1987

[30] Foreign Application Priority Data

Feb. 7, 1986 [JP] Japan .................................. 61-23822

[51] Int. Cl.[4] ............................................. H01M 8/06
[52] U.S. Cl. ...................................... 429/17; 429/13; 429/20
[58] Field of Search ...................... 429/13, 16, 17, 20

[56] References Cited

U.S. PATENT DOCUMENTS

| | | | |
|---|---|---|---|
| 4,041,210 | 8/1977 | Van Dine | 429/16 |
| 4,464,444 | 8/1984 | Mikawa | 429/13 |
| 4,680,240 | 7/1987 | Furukuwa et al. | 429/13 |

FOREIGN PATENT DOCUMENTS

| | | | |
|---|---|---|---|
| 0170277 | 2/1986 | European Pat. Off. | |
| 2512363 | 9/1976 | Fed. Rep. of Germany | |
| 2375729 | 7/1978 | France | |
| 56-159069 | 3/1982 | Japan | |
| 57-212777 | 3/1983 | Japan | |
| 60-160579 | 8/1985 | Japan | 429/13 |
| 60-160580 | 8/1985 | Japan | 429/13 |
| 60-189872 | 9/1985 | Japan | 429/13 |
| 60-212971 | 10/1985 | Japan | 429/13 |
| 61-88460 | 9/1986 | Japan | |
| 61-168876 | 12/1986 | Japan | |
| 2132108 | 7/1984 | United Kingdom | |

OTHER PUBLICATIONS

"Description of a Generic 11-MW Fuel Cell Power Plant for Utility Applications", EPRI EM-3161, Sep. 1983.

Primary Examiner—Aaron Weisstuch
Attorney, Agent, or Firm—Antonelli, Terry & Wands

[57] ABSTRACT

This invention relates to a favorable method of starting a fuel cell power generation system in which fuel is used directly as a heating medium for raising the temperature of said system. Namely, the present invention relates to a method of starting a fuel cell power generation system composed of (a) a reformer which is composed of a reforming part packed with reforming catalyst and a heating part and in which a fuel is fed to the reformer inlet and the fuel is combusted at the heating part, thereby to heat the reforming part and (b) the above-mentioned fuel cell in which the fuel which has been passed through said reformer reforming part is introduced to the anode and the exhaust gas produced at said reformer heating part is fed to the cathode, comprising the step of starting the fuel cell power generation system to ignite the fuel present at the reformer heating part only when the reformer reforming part has been filled with fuel.

18 Claims, 3 Drawing Sheets

METHOD OF STARTING FUEL CELL POWER GENERATION SYSTEM

BACKGROUND OF THE INVENTION

This invention relates to a fuel cell power generation system. More particularly, it relates to a favorable method of starting said system in which fuel is used directly as a heating medium for raising the temperature of said system.

Only a few cases have hitherto been known in which any description is made regarding the method of starting a fuel cell power generation system. For example, in "Description of a Generic 11-MW Fuel Cell Power Plant for Utility Applications" (EPRI EM-3161, Sept., 1983), which gives a typical example of investigation on a power generation system using a phosphoric acid type fuel cell, it is described regarding the start-up temperature elevation of a fuel reformer that "during start-up, the system is filled with nitrogen, and a start-up recycle compressor is operated such that nitrogen is circulated through a reformer and a heating system operated by means of a starting torch provided at the upper part of the reformer"; as to the start-up temperature elevation of the fuel cell, it is shown that said temperature elevation is effected by providing a heater in a cell-cooling system which is used as such in normal operation, heating the coolant water by means of the heater, and circulating the heated water.

The reformer is divided into a reaction part and a heating part, and the reaction part is packed with a catalyst for reforming. Therefore, inflow of an oxygen-containing gas to the reaction part should be avoided because it would poison the property of the catalyst. Accordingly, it has been general practice to use nitrogen, an inert gas, as the heating medium.

However, when nitrogen is used as a heating medium in the prior method, it causes an increase of the consumption of said nitrogen gas, and necessitates providing a nitrogen recycle system for start-up. Further, a process step is necessary to replace high-temperature nitrogen used in start-up with low-temperature fuel, which causes an increase of start-up time and necessitates a control system to suppress the pressure fluctuation in the fuel system.

Further, although the use of coolant water for raising the temperature of a fuel cell is practicable in a phosphoric acid type fuel cell, which operates at relatively low temperature (about 170° to 210° C.), an other method of temperature elevation is required for a molten carbonate type fuel cell, which can operate only at high temperature (about 400° C. or above).

SUMMARY OF THE INVENTION

The object of this invention is to provide a method of fuel cell power generation having a good starting characteristic in which auxiliary equipment and operation procedures necessary for start-up are simplified.

The above-mentioned problems can be solved when the cell is started by using fuel directly as a heating medium for elevating the temperature of the fuel cell power generation system. By using fuel directly as mentioned above, it is possible either to start a fuel reformer, a fuel cell, and a gas turbine each individually, or to start the whole power generation system comprising these constituents.

According to this invention, since no inert gas is used in start-up, changeover from inert gas to fuel becomes unnecessary, and the temperature elevation and start-up of the system can be conducted in a short time. Further, in start-up temperature elevation of a fuel cell power generation system, the following conditions are required in general for the heating medium used for elevating the temperature of a fuel reformer and a fuel cell, which are principal apparatuses constituting the fuel cell power generation system. Thus, for the reaction part of a reformer, it is necessary (a) to prevent the poisoning of reforming catalyst due to oxygen and (b) to avoid carbon deposition. For a molten carbonate type fuel cell, there are required (a) prevention of anode corrosion due to oxygen, (b) avoiding carbon deposition and (c) the presence of $CO_2$ at a temperature higher than the temperature of molten electrolyte (about 400° C.), to prevent the transpiration of the electrolyte. According to this invention, the fuel used for the fuel cell power generation system can be employed as the heating medium such that the above conditions might be satisfied. Since the fuel contains no oxygen, it is effective in preventing poisoning of the reforming catalyst and corrosion of the anode. Further, above the temperatures at which carbon deposition reaction takes place, carbon deposition can be prevented by mixing steam with the fuel. Furthermore, above the temperatures at which the transpiration of fuel cell electrolyte becomes a problem, it is possible to prevent the transpiration of electrolyte by mixing $CO_2$ with the fuel.

According to this invention, a fuel cell power generation system can be provided which has a good starting characteristic and in which auxiliary equipment and operational procedures necessary for start-up are simplified.

DESCRIPTION OF THE PREFERRED EMBODIMENT(S)

This invention will be explained below by way of some embodiments thereof and with reference to Drawings.

Figure 1:
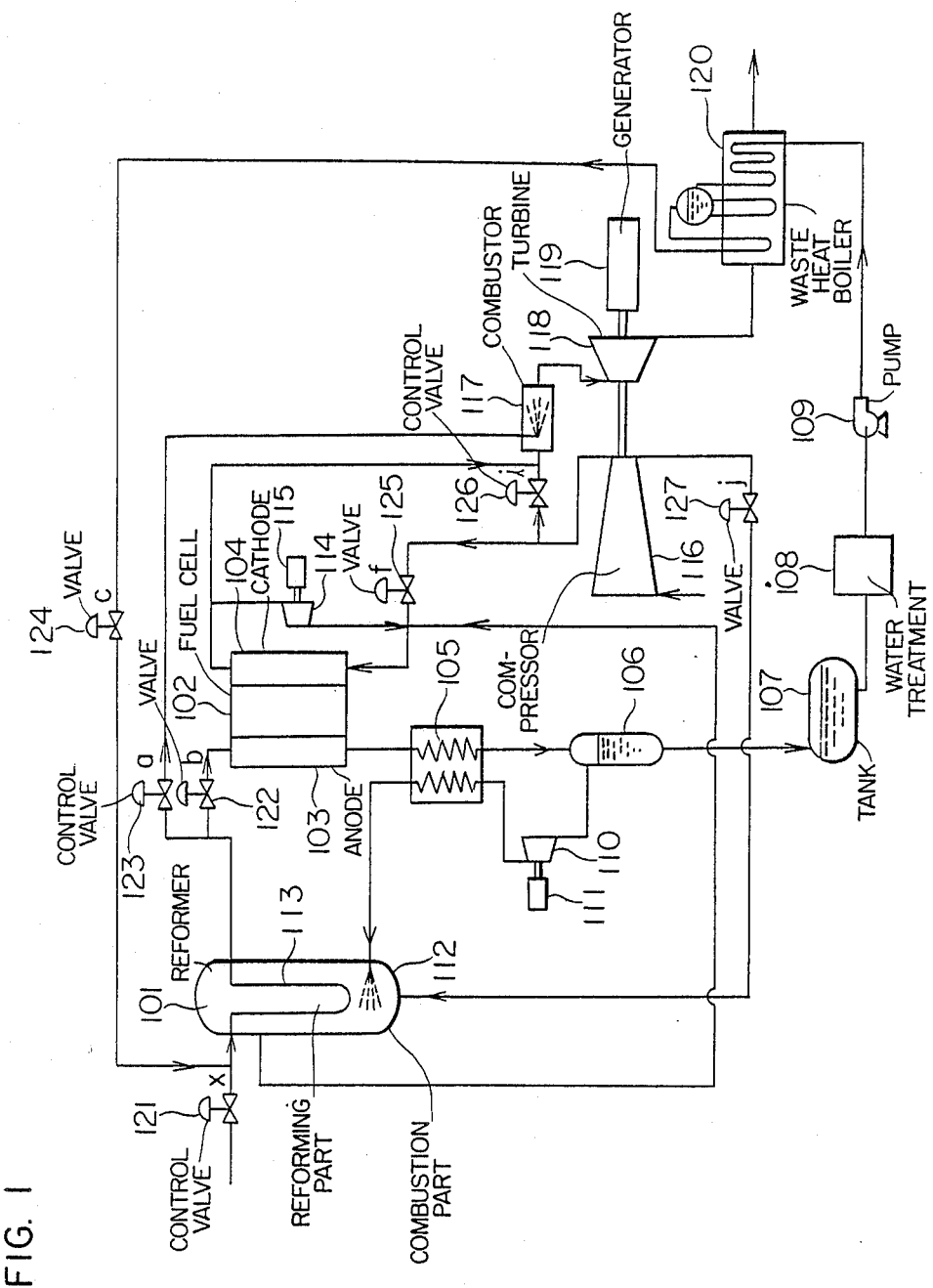
FIG. 1 shows a flow diagram of a molten carbonate type fuel cell.

FIG. 1 shows an embodiment of this invention as applied to a molten carbonate type fuel cell. Description will be made hereinbelow with reference to FIG. 1.

The principal apparatuses constituting a molten carbonate type fuel cell power plant include a fuel reformer 101, a molten carbonate type fuel cell 102, an air compressor 116, a turbine 118, and a waste heat boiler 120.

The fuel reformer 101 is composed of a fuel reforming part 113 and a combustion heating part 112 partitioned from the reforming part with a wall. The fuel reforming part is packed with reforming catalyst. The inlet of the fuel reforming part is connected, though not shown in FIG. 1, to a fuel feeding part, and is provided with a control valve x121. The outlet is connected, through a control valve b122, to the anode 103 of the molten carbonate type fuel cell 102. The molten carbonate type fuel cell 102 comprises an anode 103, a cathode 104, and a carbonate electrolyte interposed between the two; a fuel passage is provided on the anode 103 side and an air passage is provided on the cathode 104 side. The anode outlet is connected to a heat exchanger 105, and the outlet of the heat exchanger is connected to a knockout drum 106. Two outlet lines are provided for the knockout drum, one being connected to a water tank 107 and the other to an anode blower 110. The anode blower 110 is connected with a motor 111 and its outlet is connected, through the above-mentioned heat exchanger 105, to the combustion heating part 112 of the reformer 101 mentioned above.

The combustion heating part 112 is also connected, through a control valve J127, to compressor 116.

The air compressor 116, turbine 118 and generator 119 are connected with the same power system and, though not shown in the Figure, the power system is further connected, through a clutch, with a drive assembly. The outlet of the compressor 116 is connected, through a control valve f125, to the cathode 104 of the fuel cell 102 mentioned above. The cathode outlet divides in two directions, one being connected, through a cathode blower 114 connected with a motor 115, to the cathode inlet and the other being connected to the passage between the compressor 116 and the turbine 118. Between the compressor 116 and the turbine 118 are provided a control valve i126 and a combustor 117. The combustor 117 is further connected through a control valve a123 to the outlet of the reforming part 113 of the reformer 101.

The combustion heating part 112 of the reformer 101 is connected to the inlet part of the cathode 104 of the fuel cell 102 mentioned above.

At the outlet of the turbine 118 is provided a waste heat boiler 120. The turbine outlet and the waste heat boiler inlet are connected to each other, and the waste heat boiler outlet is connected, though not shown here, to a flue gas treating apparatus.

The water tank 107 is connected, through a water treatment apparatus 108 and a water feed pump 109, to the waste heat boiler 120. The waste heat boiler is further connected to the inlet part of the reformer 101 through a control valve c124.

The function of each above described apparatus under rated operation conditions is described below.

Examples of fuel which may be used in fuel cells include natural gas, LPG, methanol, and gas oil. Although this invention can be applied to any of the fuels mentioned above, description will be made herein with reference to natural gas, which is representative of these fuels, by way of example.

Natural gas is supplied from a fuel feed source to the reforming part 113 of the reformer 101 via a control valve x121. Steam necessary for reforming reaction is mixed with natural gas before the natural gas enters the reforming part. In the reformer 101, the reforming reaction catalyzed by the catalyst present in the reforming part 113 takes place with the aid of heat generated in the combustion heating part 112. The reforming reaction of $CH_4$, the principal component of natural gas, is generally expressed as follows.

$$CH_4 + H_2O \rightleftharpoons 3H_2 + CO$$

$$CO + H_2O \rightleftharpoons H_2 + CO_2$$

The composition of gas after reforming depends on the reforming temperature. As to the relationship between reforming temperature and gas composition, as disclosed for example in "New Energies and Future Power Generation Technology", Electrical Calculation (Denki Keisan), Special Number (Vol. 49, No. 8, p. 374, 1981-5), the concentrations of hydrogen and carbon monoxide are high at high reforming temperatures and the concentration of methane and carbon dioxide are high at low reforming temperatures. A practically useful reforming reaction becomes active above the temperature at which the reforming catalyst becomes active; generally a reforming temperature of about 800° C. is adopted.

The fuel gas, comprises $H_2$, $CO$, $H_2O$, $CO_2$, $CH_4$ and other components after reforming, enters, through the control valve b122, the anode 103 of the molten carbonate type fuel cell 102. A molten carbonate type fuel cell uses carbonate as electrolyte. Examples of the carbonate are $Li_2CO_3$, $Na_2CO_3$, $K_2CO_3$ and the like. These salts are solid at ordinary temperature and assume a molten state during operation of the cell. Although the fusion temperature of carbonates varies depending on the composition of the carbonates, it is generally about 400° C. or above, as shown in "Review on Fuel Cell Power Generation Technology", Technical Report of Society of Electricity (Japan) (Denki Gakkai Gijutsu Hokoku) Part II, FIG. 141, p. 50 (Dec., 1982). Below said temperature, carbonates are solid, show no ionic conductivity, and cannot function as a fuel cell component.

Generally, a temperature of about 650° C. is selected as the working temperature of a molten carbonate type fuel cell. This is because, though the efficiency of the cell is higher as the temperature is higher, the life of the fuel cell becomes short at temperatures exceeding an upper limit of about 650° C. owing to the transpiration of electrolyte and other factors.

In the cell, the following reactions take place among hydrogen of the anode 103 side, oxygen of the cathode 104 side, and carbon dioxide.

Cathode $$\tfrac{1}{2} O_2 + 2e \rightarrow CO^{2-}_3$$

Anode $$H_2 + CO_3^{2-} \rightarrow H_2O + CO_2 + 2e$$

Thus, migration of carbonate ion $CO_3^{2-}$ takes place in the electrolyte, and carbon dioxide must be replenished, besides oxygen, on the cathode 104 side. Further, not all of the fuel is consumed in the cell. This is to prevent the lowering of efficiency due to decrease of average partial pressure of fuel and to use the remaining fuel as the fuel for the combustion heating part 112 of the reformer 101. The reaction in the fuel cell is exothermic, unlike that in the reformer, and hence the temperature of fuel gas at the anode outlet becomes high. In the embodiment shown in FIG. 1, steam required in reforming is separated from the anode outlet. Resultantly, the concentrations of remaining gas components are high, combustion at the reformer combustion heating part 112 is improved, and further the concentration of oxygen and carbon dioxide at the cathode 104 can be increased, leading to an enhanced cell efficiency.

To separate water from the anode outlet gas, the temperature of the anode 103 outlet gas is decreased by means of the heat exchanger 105, and further lowered in the knockout drum 106, whereby the moisture in the gas is decreased to that corresponding to the vapor pressure at the temperature and water is separated. The separated water enters the water tank 107, and the anode outlet gas after the separation is brought to elevated pressure by means of the anode blower 110 driven by the motor 111, then introduced into the above-mentioned heat exchanger 105, where it cools the gas which has just left the anode 103 outlet, while it increases its own temperature.

The outlet gas from the heat exchanger 105 is introduced into the combustion heating part 112 of the reformer 101, combusted with air brought to elevated pressure by means of the compressor 116 and delivered through the control valve j127. The heat of combustion is transferred to the reforming part 113, affording heat to the reforming reaction. The combustion gas from the combustion heating part 112 is sent to the cathode 104 inlet part and mixed with air delivered from the air compressor 116.

The air compressor 116 raises the pressure of the air, and sends a part of the air to the combustion heating part 112 of the reformer 101 mentioned above. The remainder of the air is sent to the cathode 104 of the molten carbonate type fuel cell 102 through the control valve f125. In the cathode 104, oxygen and carbon dioxide are consumed through electrochemical reaction. Part of the cathode 104 outlet gas, whose temperature has been raised owing to the exothermic reaction occurring in the cell, is recycled to the cathode 104 inlet part by means of the cathode blower 114 driven by the motor 115. The purpose of recycling is to decrease the temperature difference in the cathode, thereby to decrease the development of thermal stress, and to increase the cathode inlet temperature to prevent the coagulation of molten carbonate, and further to improve the utilization factor of oxygen and carbon dioxide. The remainder of the cathode outlet gas enters the passage between the air compressor 116 and the turbine 118. In this embodiment, a control valve i126 and a combustor 117 are provided at the outlet of the compressor 116. The above-mentioned cathode outlet gas enters between the control valve i126 and the combustor 117, then enters the turbine 118 via the combustor 117 to do its work. Under rated operation conditions, the control valve i126 and the control valve a123 are either totally closed so as to stop the flow of air and fuel to the combustor 117 completely, or opened very slightly to maintain only the combustion of the pilot burner in the combustor.

The air compressor 116 and the generator 119 are driven by means of the turbine 118. The exhaust gas from the turbine outlet is introduced into the waste heat boiler 120.

Water stored in the water tank 107 is treated in the water treatment equipment 108, then brought to elevated pressure and sent to the waste heat boiler 120 by means of the feed water pump 109. Steam is produced from the water in the waste heat boiler 120, and sent to the reforming part 113 inlet of the reformer 101 via the control valve c124.

The operation procedures in start-up according to this invention will be described below by way of the embodiment shown in FIG. 1.

In start-up, generally an inert gas is filled in the reforming part 113 of reformer 101 and the fuel cell 102. All the control valves shown in FIG. 1 are closed.

First, the drive assembly is started by opening the control valve i126 provided between the compressor 116 and the combustor 117, to run the compressor 116, turbine 118 and generator 119. Air is sent to the combustor 117 by the running compressor 116. Then, the control valves x121 and a123 of the fuel feed system are gradually opened, and the combustor is started by means of an ignition device provided in the combustor 117. When the compressor 116, turbine 118 and generator 119 system attain respective set values of rotating speed, the clutch connecting the system with the drive assembly is let out and self-sustaining operation is conducted. When the amount of fuel is further increased at the time when the rated rotating speed has been reached, the generator 120 can begin power generation.

During this period, the fuel is fed through the reforming part 113 of the reformer 101. However, since the reforming part is at the feed fuel temperature (generally ordinary temperature), the catalyst is inactive and carbon deposition reaction does not take place.

By operation of the compressor 116, combustor 117, turbine 118 and generator 119 system, a high-temperature combustion exhaust gas is fed from the turbine 118 outlet to the waste heat boiler 120. On the other hand, water in the tank 107 is fed through the water treatment equipment 108 to the waste heat boiler 120 by means of the feed water pump 109. Steam generated in the waste heat boiler 120 is passed through the control valve c124 and is mixed with fuel at the reforming part 113 outlet of the reformer 101. By means of this steam-mixing, the fuel can be passed through the reforming part under conditions at which carbon deposition does not take place, and the reforming part is brought to elevated temperature by the steam, and thus becomes ready for reforming.

Then, the control valve b122 at the anode 103 inlet and the control valve f125 at the cathode 104 inlet are gradually opened to introduce fuel and steam into the anode 103, and air into the cathode 104, whereby the temperature of the cell is increased. Simultaneous inflow to the anode 103 and the cathode 104 facilitates the control of differential pressure between the anode and the cathode. At the same time, the control valve j127 at the compressor outlet is also gradually opened in order to send air to the combustion part 112 of the reformer 101.

At the time when the fuel passed through the anode 103 and the air from the compressor 116 have reached the combustion heating part 112 of the reformer 101, combustion at the combustion heating part 112 is initiated. For the sake of safety, it is desirable that the combustion part of the reformer be fed with air in advance, and a flare system and a purge system be provided to be used in the event of flame-out.

By combustion at the combustion heating part 112 of the reformer 101, the temperature of the reformer is elevated and, at the same time, fuel gas of elevated temperature is fed to the anode 103, thereby to increase the temperature of the fuel cell. High-temperature fuel gas discharged from the combustion part is mixed with air passed through the control valve f126, and the mixture is fed to the cathode 104 to raise the temperature of the cathode. Part of the gas flowing out from the cathode 104 is recycled, but the remainder is mixed at the combustor 117 inlet with air passed through the air compressor 116, and fed to the combustor 117.

If the temperature elevation in the reformer 101 and the molten carbonate type fuel cell 102 is scheduled such that the carbonate which is the electrolyte in the fuel cell 102 would begin melting after the reforming catalyst in the reforming part 113 of the reformer 101 has reached the temperature at which the catalyst becomes active and can cause reforming reaction, then the anode 103 is fed with a fuel containing carbon dioxide produced by the reforming reaction and the cathode 104 is fed with a combustion gas containing carbon dioxide produced at the combustion heating part, whereby the above-mentioned transpiration of carbonates can be prevented.

When the electrolyte of the fuel cell 102 reaches a completely molten state, since the anode 103 is being fed with hydrogen, carbon monoxide, and carbon dioxide which have been produced by reforming and the cathode 104 is being fed with carbon dioxide produced at the combustion heating part 112 of the reformer 101 and with oxygen delivered from the air compressor 116, the cell becomes capable of generating power. Thus, heat generation takes place concurrently with power generation, and the cell raises its temperature by itself.

After the reformer and the fuel cell have reached the temperature of rated operation or that corresponding thereto, the fuel from the reformer 101 is throttled by means of the fuel control valve a123, and the air from the compressor 116 by means of the air control valve i126, to stop the combustion in the combustor 117 or to maintain a pilot flame alone.

Figure 2:
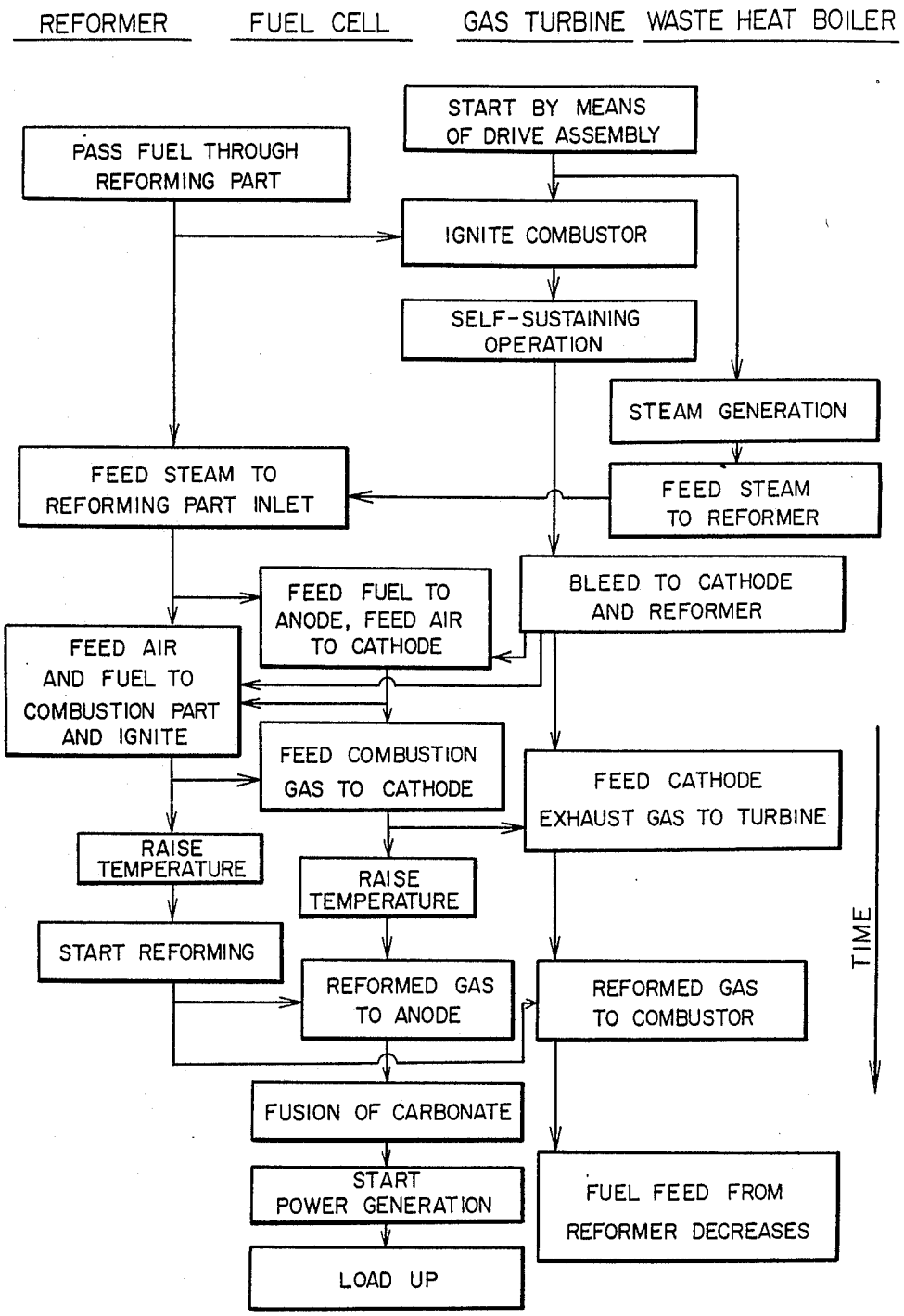
FIG. 2 is a block diagram showing the operational procedures for principal apparatuses in starting a molten carbonate type fuel cell.
Figure 3:
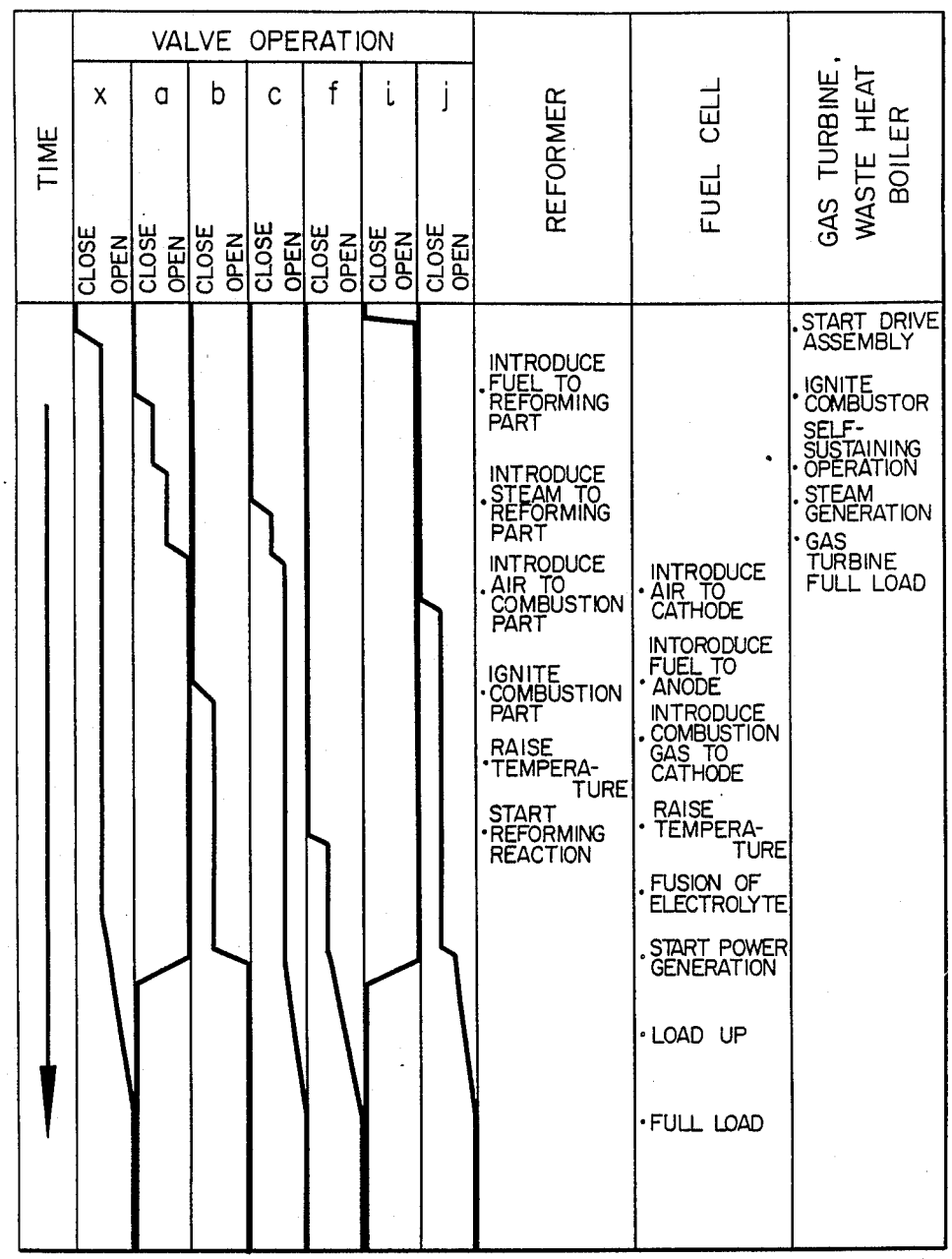
FIG. 3 is a chart showing the operational procedures in starting a molten carbonate type fuel cell and an example of the operation of respective valves.

The operational procedures for the principal apparatuses in start-up are shown collectively in FIG. 2. Further, the operational procedures of FIG. 2 and an example of the operations of respective valves are shown in FIG. 3.

In stoppage, approximately reverse procedures to those in start-up are followed. The fuel control valve a123 at the reformer 101 outlet is opened to start feeding fuel to the combustor 117 and to actuate the combustor 117. At this time, if necessary, the air control valve i126 is opened to feed air to the combustor 117. However, the amount of air passed through the control valve i126 is preferably restricted to the necessary minimum because the exhaust gas from the cathode 104 outlet also contains oxygen and the oxygen consumption in the cell decreases with the decrease of the load of the fuel cell, and because it is advantageous for promoting the cooling of the cell to send a larger amount of air to the cathode.

Concurrently with decreasing the load of the cell and with gradual closing the fuel control valve b122, air is sent in a large amount from the air control valve j127 at the compressor 116 outlet to the reformer combustion heating part 112, to cool also the reformer 101.

At the time when the temperature of the reformer 101 and the fuel cell 102 have decreased, the control valves b122, f125 and j127 are completely closed, the control valve i126 is opened, and air is fed to the combustor 117.

Cooling is preferably scheduled such that the reforming reaction in the reformer 101 would stop after coagulation of the molten carbonate in the fuel cell 102 has taken place because it is effective for preventing the evaporation of carbonates.

When the feed of fuel and air to the fuel cell 102 has come to a halt, the atmosphere in the cell anode 103 and the cathode 104 is replaced with inert gas.

In the last stage, at the time when fuel is fed to the combustor 117 through the reformer 101, only the system of the compressor 116, combustor 117, turbine 118, generator 119, and waste heat boiler 120 is in operation, and the temperature of the reforming part 113 of the reformer 101 has been decreased to a point at which the reforming catalyst becomes inactive, the control valve c124 is closed to stop the supply of steam from the waste heat boiler 120, and subsequently the control valves x121 and a123 are closed to stop also the system of the compressor 116, combustor 117, turbine 118 and generator 119.

Next, procedures followed in load cutoff from full load, one of the most abrupt change encountered in operation, will be described below. In load cutoff, it is required, owing to some trouble in the system of transmission and transformation, etc., to stop power generation immediately and at the same time to keep the plant in stand-by state.

An indispensable requisite in stand-by state is to maintain the temperature of the reformer 101 and the fuel cell 102. The reformer should be maintained at least at a temperature not lower than the temperature at which the catalyst becomes active, and the fuel cell should be maintained at a temperature not lower than the temperature at which the carbonate of the electrolyte fuses. These conditions were already shown as the restrictions for start-up described above. The reformer inlet fuel should be mixed with steam to use it for reaction and to prevent carbon deposition, and the gas fed to the fuel cell should be mixed with carbon dioxide to prevent the transpiration of carbonate.

The signal for load cutoff enters the control valves shown in FIG. 1, whereby the control valves x121, b122, f125, and j127 begin to close rapidly, the control valves a123 and i126 open rapidly, the combustor 117 is actuated to feed the combustion gas from the combustor 117 to the turbine 118 in place of the cathode 104 exhaust gas.

At the final stage, a small amount of fuel is introduced into the reforming part 113 of the reformer 101 via the control valve x121 to be reformed. Then, part of the reformed gas is fed to the anode 103 of the fuel cell 102 via the control valve b122 and the remainder is fed to the combustor 117 via the control valve a123 to be combusted. The flow rate of fuel passed through the control valve b122 is selected so as to satisfy the amount necessary for reforming reaction at the reforming part 113 of the reformer 101 and for maintaining the temperature of the reformer 101 and the fuel cell 102. The flow rate of fuel passed through the control valve a123 is selected such that the driving power of the turbine 118 might balance with the driving power of the compressor 116. At this time, if the temperature of exhaust gas at the waste heat boiler 120 inlet becomes lower than that required for steam generation, it is necessary to increase the fuel flow passing through the control valve a123 and to effect supplementary heating at the waste heat boiler 120 inlet. Accordingly, an apparatus therefor should be provided.

Part of the air from the air compressor 116 is fed to the reformer combustion heating part 112 via the control valve j127 only in the minimum amount necessary for the combustion of fuel passed through the anode 103. The remainder of the air is all introduced into the combustor 117 via the control valve i126. Thus, the cathode 104 of the fuel cell 102 is fed only with combustion exhaust gas from the reformer combustion heating part 112 which contains carbon dioxide but little oxygen. The temperature of the fuel cell is maintained by the sensible heat of the gas and of the reformed fuel passed through the anode.

Further, since the waste heat boiler 120 is in operation, steam is supplied to the reformer reforming part 113 consecutively.

According to one embodiment of this invention, the following effect can be obtained. Thus, in the event of failure in the fuel cell section, the control valves b122, f125 and j127 are closed to stop the supply of fuel and air to the fuel cell system, and the control valves a123 and i126 are opened to increase the load applied on the system of the compressor 116, combustor 117, turbine 118 and generator 118, whereby impairment of the function as a power generation plant is obviated.

What is claimed is:

1. A method of starting a fuel cell power generation system provided with (a) a fuel reformer having a reforming part through which a heated raw fuel is passed and a heating part which affords heat to said reforming part, wherein said reforming part is packed with reforming catalyst; (b) a fuel cell provided with an anode and a cathode in which a fuel containing hydrogen is fed to the anode and a gas containing oxygen is fed to the cathode to effect power generation; and (c) pipe lines connecting an outlet of said reformer reforming part to said fuel cell anode; characterized in that at the time of starting said fuel cell power generation system, the heated raw fuel is introduced to said reformer reforming part and then is introduced through said pipe lines into said fuel cell anode, thereby to raise the temperature of said reformer and said fuel cell.

2. A method of starting a fuel cell power generation system according to claim 1, wherein said raw fuel is natural gas, LPG, methanol or gas oil.

3. A method of starting a fuel cell power generation system according to claim 1, wherein the temperature of said reformer and said fuel cell is raised prior to heating said raw fuel by heating said reformer reforming part using said reformer heating part.

4. A method of starting a fuel cell power generation system according to claim 1, wherein said raw fuel passes through said reformer reforming part under conditions at which carbon deposition does not take place, and no poisoning of the reforming catalyst takes place.

5. A method of starting a fuel cell power generation system comprising (a) a reformer which is made up of a reforming part packed with reforming catalyst, having an inlet through which a heated raw fuel is fed; and a heating part in which said raw fuel is combusted to heat said reforming part and (b) a fuel cell in which said raw fuel which has passed through said reformer reforming part is introduced into an anode and exhaust gas produced by combustion in said reformer heating part is fed to a cathode, wherein said raw fuel is ignited at said reformer heating part only when said reformer reforming part has been filled with said heated raw fuel.

6. A method of starting a fuel cell power generation system according to claim 3, wherein said raw fuel is natural gas, LPG, methanol or gas oil.

7. A method of starting a fuel cell power generation system according to claim 5, wherein the temperatures of said reformer reforming part and said fuel cell are raised prior to igniting said raw fuel at said reformer heating part.

8. A method of starting a fuel cell power generation system according to claim 5, wherein said raw fuel passes through said reformer reforming part under conditions at which carbon deposition does not take place, and no poisoning of the reforming catalyst takes place.

9. A method of starting a fuel cell power generation system comprising (a) a reformer which is made up of a reforming part packed with reforming catalyst having an inlet through which a mixture of steam and a heated raw fuel is fed and a heating part in which said raw fuel is combusted to heat said reforming part and (b) a fuel cell in which said raw fuel which has passed through said reformer reforming part is introduced into an anode and exhaust gas produced by combustion in said reformer heating part is fed to a cathode, wherein said raw fuel is ignited at said reformer heating part only when said reformer reforming part has been filled with said mixture of steam and heated raw fuel.

10. A method of starting a fuel cell power generation system according to claim 9, wherein said raw fuel is natural gas, LPG, methanol or gas oil.

11. A method of starting a fuel cell power generation system according to claim 9, wherein the temperatures of said reformer reforming part and said fuel cell are raised prior to igniting said raw fuel at said reformer heating part.

12. A method of starting a fuel cell power generation system according to claim 9, wherein said raw fuel passes through said reformer reforming part under conditions at which carbon deposition does not take place, and no poisoning of the reforming catalyst takes place.

13. A method of starting a fuel cell power generation system comprising (a) a reformer which is made up of a reforming part packed with reforming catalyst, having an inlet through which a heated raw fuel is fed and a heating part in which said raw fuel is combusted to heat said reforming part and (b) a fuel cell in which said raw fuel which has passed through said reformer reforming part is introduced into an anode, exhaust gas produced by combustion in said reformer heating part is fed to a cathode and said raw fuel which as passed through said anode is fed to said reformer heating part, wherein said raw fuel is ignited at said reformer heating part only when said reformer reforming part has been filled with said heated raw fuel.

14. A method of starting a fuel cell power generation system according to claim 13, wherein said raw fuel is natural gas, LPG, methanol or gas oil.

15. A method of starting a fuel cell power generation system according to claim 13, wherein the temperatures of said reformer reforming part and said fuel cell are raised prior to igniting said raw fuel at said reformer heating part.

16. A method of starting a fuel cell power generation system according to claim 13, wherein said raw fuel passes through said reformer reforming part under conditions at which carbon deposition does not take place, and no poisoning of the reforming catalyst takes place.

17. A method of starting a fuel cell power generation system, comprising:
a first stage including the steps of filling a reforming part of a reformer with inert gas; and filling a fuel cell with inert gas, wherein said reformer and said fuel cell are connected by a pipe line;
a second stage including the steps of starting a drive assembly comprising a compressor, a combustor, a turbine and a generator by feeding air from said compressor to said combustor; feeding fuel to said reformer reforming part and from said reformer reforming part to said combustor; and engaging a clutch of said drive assembly when said compressor, said turbine and said generator have attained a predetermined rotating speed;

a third stage including the steps of feeding a high-temperature combustion exhaust gas produced by said drive assembly to a waste heat boiler; feeding water to said waste heat boiler; generating steam in said waste heat boiler; and feeding steam generated in said waste heat boiler to said reformer reforming part where it is mixed with fuel fed to said reformer reforming part;

a fourth stage including the steps of feeding fuel and steam from said reformer reforming part to an anode of said fuel cell; feeding air to a cathode of said fuel cell; and feeding air from said compressor to a reformer combustion part;

a fifth stage including the steps of elevating the temperature of said anode by elevating the temperature of said fuel and steam fed to said anode from said reformer reforming part, by in turn elevating the temperature of said reformer reforming part by combusting said air fed to said reformer combustion part from said compressor; elevating the temperature of said cathode by feeding a high-temperature combustion gas to said cathode from said reformer combustion part and by feeding air to said cathode from said compressor of said drive assembly; recycling a portion of gas exiting said cathode; and feeding a remainder of gas exiting said cathode to said combustor of said drive assembly; and a sixth stage including the steps of attaining an operational temperature in said reformer and said fuel cell; reducing said feed of fuel from said reformer reforming part to said combustor of said drive assembly; reducing said feed of air from said compressor to said combustor of said drive assembly; and stopping combustion in said combustor of said drive assembly.

18. A method of starting a fuel cell power generation system according to claim 17, wherein said fuel is natural gas, LPG, methanol or gas oil.

* * * * *